Dec. 16, 1969   R. W. POSTMA   3,484,732
DUAL RANGE PRESSURE SENSOR
Filed Dec. 7, 1967   2 Sheets-Sheet 2
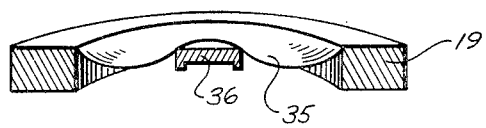
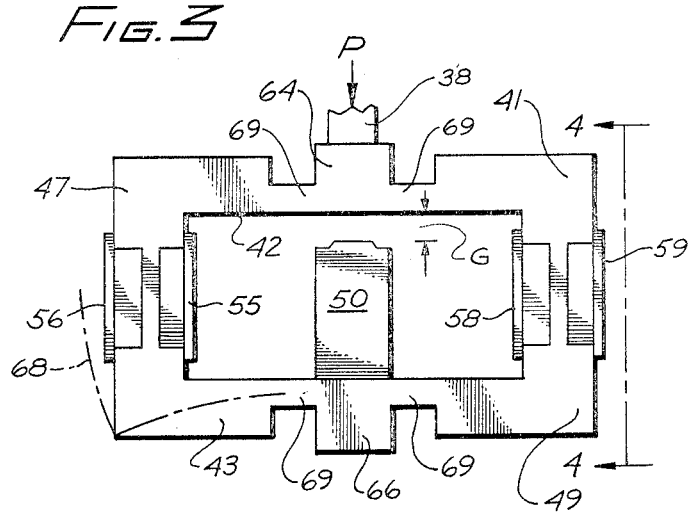
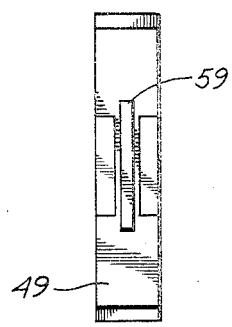
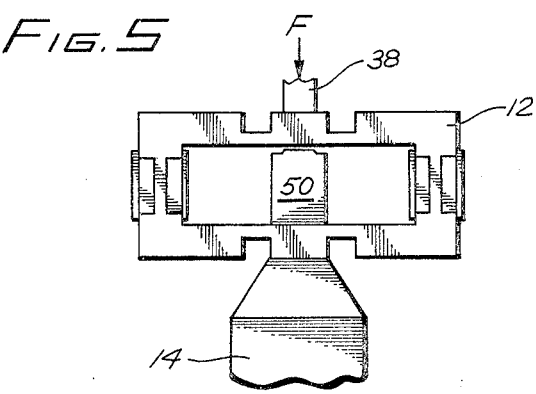
INVENTOR.
ROBERT W. POSTMA
BY John E. Kelly
ATTORNEY

United States Patent Office 3,484,732
Patented Dec. 16, 1969

3,484,732
DUAL RANGE PRESSURE SENSOR
Robert W. Postma, 21817 Lanark St.,
Canoga Park, Calif. 91304
Filed Dec. 7, 1967, Ser. No. 688,921
Int. Cl. G01l 1/22, 5/12
U.S. Cl. 338—4                             3 Claims

ABSTRACT OF THE DISCLOSURE

A pressure transducer having a diaphragm for converting fluid pressure to a force that is then transmitted to a low range sensor protected by a stop from being overloaded and damaged. A subsequently operated high range sensor absorbs and measures forces in excess of the overload force. The low range sensor is a hollow rectangular or box frame and the high range sensor is a compression block, both incorporating strain gages. When the overload force is attained, additional increments of force are transmitted through the low range sensor and stop to the high range sensor.

BACKGROUND OF THE INVENTION

Pressure or force responsive transducers for measuring variable force or pressure are well known in the prior art. Single transducers are greatly limited in their capacities for measuring force or pressure over a relative broad range. Requirements often exist for measuring force or pressure over an extensive range that a single transducer is capable of accurately measuring. A highly sensitive transducer, which is necessary for measuring low range pressure, is inherently delicate and prone to destruction when subjected to an ascertainable overload pressure, well below the maximum pressure limit. Conversely, transducers characterized by the necessary stiffness to accurately measure high range pressure are insensitive and therefore are inaccurate and erratic within low pressure ranges. Pressure responsive instruments (such as strain gages and diaphragm capsules linked to dial indicators) which are sufficiently strong, to measure over extensive pressure ranges are not sensitive enough to accomplish accurate measurements in low pressure ranges. To achieve the necessary accuracy for the entire pressure range, it is known in the art to link together and sequentially operate low range and high range pressure responsive instruments.

One approach for measuring over an extensive fluid pressure range, as evidenced by U.S. Patent 2,185,971 to Achtel et al., is characterized by linking together a sensitive low pressure range diaphragm capsule and a less sensitive but stronger high pressure range diaphragm capsule. When the sensitive capsule attains its maximum value, it engages a stop that prevents overstraining. Additional pressure is absorbed by the high pressure range capsule. A related type pressure responsive arrangement is disclosed in U.S. Patent 3,279,250 to Hezel et al. Another type instrument for measuring over a broad pressure range (as explained in U.S. application Ser. No. 645,029 filed June 9, 1967, which invention is assigned to the assignee of this invention) comprehends a pressure transducer having a housing in which is positioned a tubular shaped strain sensing unit formed with a plurality of concentrically aligned deflectable hoops. Pressure applied axially to the unit is measured by the amount of strain sensed by strain gages bonded to the hoops. The hoops deflect at different rates allowing pressure measurement over a selectively broad range and their movements are limited by stops to protect the hoops from overstraining.

This invention is related to the type of pressure responsive instruments described above, differing in significant aspects as shall be described.

SUMMARY OF THE INVENTION

Briefly described the dual-range pressure transducer of this invention is characterized by a low range sensor, sensitive over a low range and susceptible to rupture over a high range, connected within a single housing to a high range sensor that is relatively insensitive and therefore inaccurate over a low pressure range but accurate over a high range of pressure or force incapable of impairing the structural integrity of the high range sensor. The sensors are co-axially aligned, connected together in tandem relationship for sequential operation, and are positioned in a space containing a fluid at a reference pressure. The fluid whose pressure is to be measured is introduced into the housing and distributed into a shallow chamber constituted in part by an annular flexible diaphragm. The diaphragm is arranged in fluid tight relationship to seal the fluid whose pressure is to be measured from the reference fluid. As the pressure differential is increased from zero over the lower pressure range, the diaphragm flexes and exerts force on a pressure transmitting element fixed to the low range sensor which absorbs the resulting stress. The low range sensor is a hollow rectangular or box frame whose plane is parallel with the direction of force being passed through the element. The frame is constructed of flexible beams that experience deflection until a predetermined overpressure, i.e.; maximum limit of the low pressure range, is attempted. At this time a stop positioned in the center of the frame engages one of the beams to terminate further deformation of the frame. After the frame deformation is ceased, the deflection of the diaphragm is ceased by bottoming out on an annular back-up ring. When the frame and diaphragm deflection is terminated, thereby protecting them from potential damage due to overloading, the increased force is absorbed by the high pressure sensor which is now capable of measuring pressure with the desired accuracy. Force is transmitted through the mechanical stop to the high range sensor. Additional force is transmitted to the high range sensor by a hollow cone which flares toward and is connected to the back-up ring. The high range sensor continues to measure the pressure until the pressure is relaxed to a point where it is once again within the low pressure range.

In another embodiment for measuring point forces, the diaphragm, back-up ring, and cone are eliminated, and the point force is exerted directly on the first transmitting element that in turn transmits the force to the low range sensor. The low range sensor is constructed to measure pressure or force by way of a plurality of strain gages bonded to zones of the beams that will experience maximum deflection. In these zones the beams are preferably narrowed in cross section so as to concentrate the strain energy in the region of strain gages. The high range sensor is a compression column with strain gages bonded thereon. The strain is converted by way of conventional bridge circuits to a voltage output corresponding to a calibrated pressure or force.

BRIEF DESCRIPTION OF THE DRAWINGS

The unique aspects and advantages of this invention will be fully understood upon studying the following detailed description in conjunction with the detailed drawings in which:

FIG. 2 is a perspective sectional view showing a fluid pressure responsive diaphragm employed to transmit pressure to the sensor;

FIG. 3 is an enlarged front view showing the low range sensor and the centrally located mechanical stop when zero pressure is being transmitted to the sensor;

FIG. 4 is a side view of the low range sensor taken along line 4—4 of FIG. 3;

FIG. 5 is another embodiment of the dual range sensor modified for measuring point forces.

DESCRIPTION OF THE PREFERRED EMBODIMENTS

Figure 1:
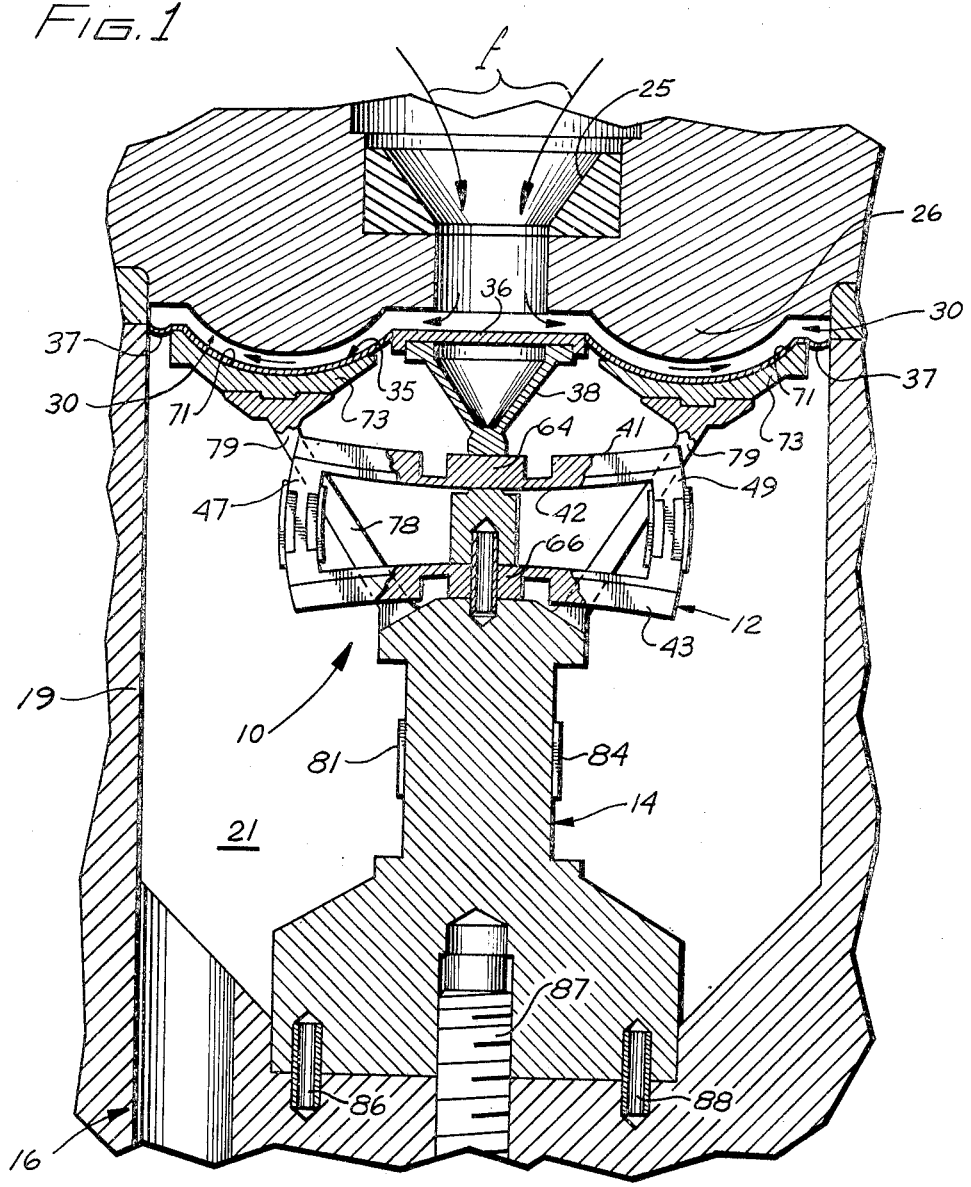
FIG. 1 is a cross-sectional view of the dual range transducer, showing the low and high range sensors coupled together with the low range sensor experiencing maximum deflection.

Referring now to the drawings, FIG. 1 illustrates a dual range pressure transducer 10 incorporating a low range sensor 12 and high range sensor 14 enclosed within a common housing 16. Housing inner wall 19 defines a space 21 which may either be evacuated of all fluid or contain fluid of a fixed reference pressure. Housing 16 is formed with a central port 25 through which the fluid $f$ whose pressure is to be measured is admitted into a shallow circular cavity 30. Cavity 30 is defined by an annular convex wall portion 26 of housing 16 and a flexible diaphragm 35 that is connected at its outer edge 37 in fluid tight relationship to housing wall 19. The surface of flexible diaphragm 35 adjacent interior wall 26 is contoured to substantially complement the convex configuration of wall 26. Diaphragm 35 is of annular shape having its inner periphery, as best shown in FIG. 2, firmly attached to the outer edge of a fluid pressure bearing cap 36. Thus the fluid occupying shallow cavity 30 is hermetically sealed from the vacuum or fluid occupying space 21. As shall be pointed out, the pressure differential between cavity 30 and space 21 is measured to establish the variable pressure in cavity 30.

Pressure bearing cap 36 is rigidly fixed to a conically shaped force transmitting element 38 in turn connected to low range sensor 12. As clearly illustrated in FIG. 3, sensor 12 is a symmetrical, hollowed rectangular frame or open box configuration. Sensor 12 has upper and lower transverse beams 41 and 43 respectively that are perpendicular to the direction of force P being transmitted through element 38. Extending between adjacent ends of transverse beams 41 and 43 are a pair of upright beams 47 and 49. Aligned in the center of sensor 12 is a mechanical stop 50 spaced by a predetermined gap G from the inner face 42 of beam 41. As will be explained when surface 42 engages stop 50 all further deformation and deflection of the flame ceases. Intermediate portions of upright beams 47 and 49 are reduced in cross section to constitute interior and exterior lands for securely bonding an array of strain gages. Bonded to the inner and outer surfaces of beam 47 are strain gages 55 and 56, respectively. Similarly, bonded to the inner and outer faces of beam 49 are strain gages 58 and 59. FIGURE 4 is a side view of the frame depicted in FIG. 3, showing strain gage 59 bonded to beam 49.

Sensor 12 as shown in FIG. 3 is at its zero load condition and gap G is of maximum spacing. As the fluid to be measured is increased either from a null pressure or zero pressure a force P will be transmitted through element 38 to sensor 12. The transverse beams 41 and 43 will deform and bow inwardly as the upright beams deflect and bow outwardly. Deformation of the frame will cease when surface 42 engages and becomes stopped by mechanical stop 50. When this condition arises the southwest corner of the frame, for purposes of example, will have assumed a configuration coinciding with the exaggerated changed position line 68. In order to transmit the maximum strain to the strain gages, flexures 69 are formed in beams 41 and 43. By narrowing the cross sections of the transverse beams in these locations, stiffness is reduced and maximum strain energy is transmitted to the strain gages that are positioned to experience maximum strain. The strain gages may be conventional semi-conductor strain gages having large gage factors that may be positive or negative, depending upon the type of doping impurities added during their construction. As is well known, the resistance of a p-doped (i.e., positive type) semi-conductor increases with applied tension whereas the resistance of an n-doped (i.e., negative type) semi-conductor decreases under tension. Taking advantage of the high gage factors possessed by semi-conductor strain gages permits great sensitivity and voltage output which allows more sensitive pressure measurement. Strain gages 55 and 58 experience compression during bending whereas gages 56 and 59 experience tension. The gages are suitably connected in an electrical bridge circuit (not shown) in a conventional manner so that variations in sensed strain can be transformed into an electrical output which in turn is calibrated to correspond with a predetermined measure of differential fluid pressure.

Gap G becomes closed when a predetermined overstrain or overload pressure is obtained. Additional potentially harmful increases of force P have no effect on sensor 12 and therefore can neither rupture the individual strain gages nor impair the integrity of the frame. Increased increments of force are passed through boss 64 to stop 50 and then from boss 66 to the high range sensor.

Low range sensor 12 as shown in FIG. 1 is at its fully flexed condition and protected from any overloading by stop 50. When the pressure differential between shallow cavity 30 and space 21 is zero, then flexible diaphragm 35 will be separated by a slight space from the concave surface 71 of a backup ring 73. As beam 41 is deflected toward stop 50, diaphragm 35 is similarly deflected toward backup ring 73. Diaphragm 35 is contoured and arranged to contact and become seated on backup ring 73 after stop 50 prevents further deflection of beam 41 and the rest of the frame of low range sensor 12. If a portion of diaphragm 35 contacted ring 73 before the frame became fully deflected then inaccurate and possibly erratic signals would be produced by sensor 12. Thus backup ring 73 stops further movement of diaphragm 35 and protects it from potential tearing or rupturing that could be caused by overpressure. It can now be seen that when the low range pressure attains its predetermined maximum value, stop 50 and backup ring 73 respectively protect low range sensor 12 and diaphragm 35 from overloading consequences. As previously mentioned, the condition of dual range pressure transducer 10 in FIG. 1 shows low range sensor inactivated since the pressure differential has been increased to a point where it exceeds the overload pressure of sensor 12.

When the maximum deflection of sensor 12 has been exceeded then force is transmitted through stop 50 to high range sensor 14 which is a compression block. Sensor 14 may be a hollow rectangular beam or have any other suitable cross section such as that of an I-beam or the like. Annular shaped diaphragm edge 37 is of sufficient thickness and strength to withstand the most adverse high range fluid forces. In addition to absorbing strain transmitted centrally through sensor 12, that is connected to sensor 14 in a "piggy-back" arrangement, sensor 14 also receives strain from a hollowed structural cone 78. Cone 78 flares upwardly from high range sensor 14 terminating in a rigid connection with the base of backup ring 73. Diametrically opposed openings 79 are formed in cone 78 to accommodate the opposing ends of sensor 12. The strain energy absorbed by high range sensor 14 is sensed by a plurality of strain gages 81 and 84. These strain gages are suitably connected in a conventional bridge circuit (not shown) so that the pressure over the high pressure range may be measured. Transducer 10 is anchored to the base of housing 16 by way of connecting elements 86, 87 and 88.

While the sensors 12 and 14 may be designed to measure over any predetermined relatively low and high pressure ranges respectively, they may, for example, be constructed to measure ranges of zero through 2 p.s.i. and 2–500 p.s.i. While the contouring of flexible diaphragm 35 is characterized by a single convolution substantially of catenary shape, it may be made with multiple convolutions, flat zones, other contouring, or with any combination of different shapes. The diaphragm may be made of any suitable resilient thin gage material such as Inconel 718 or 321 stainless steel. It may be securely attached to housing inner wall 19 and the edges of cap 36 by way of overlapping spot welds. Other attaching techniques could be brazing, adhesive bonding, diffusion bonding or laser welding. The diaphragm is constructed to resist bursting due to resonant vibrations, spurious oscillations and other potentially harmful conditions.

FIG. 5 illustrates an alternative embodiment of this invention for measuring a point force F rather than fluid pressure. In this embodiment the diaphragm, backup ring and conical structure linking the two sensors are removed and the single force F is applied to both sensors 12 and 14 through force transmitting element 38. Sensor 12 and 14 are sequentially operated over the desired pressure range and sensor 12 is protected from overpressure by stop 50.

Although particular embodiments have been chosen to best illustrate the advantages of this invention, it is to be understood that the scope of the invention is not to be limited thereby.

I claim:
1. A dual range force transducer with sequentially operable sensors comprising;
   a first sensor for sensing force over a first force range, the sensor including a hollow frame for receiving the force to be measured,
   at least two deflectable beams included in the frame, each beam having a strain sensitive element attached thereto,
   a fluid pressure responsive diaphragm connected to the first sensor for converting fluid pressure to a force and transmitting the force to the first sensor,
   a stop for stopping deflection of the frame when the frame attains a predetermined overload force, and
   a second sensor connected to and extending outwardly from a peripheral portion of said hollow frame for sensing force over a second force range exceeding the first force range and overload force.

2. The structure according to claim 1 further comprising:
   a second stop connected to said second sensor positioned adjacent the diaphragm for engaging and stopping further motion of the diaphragm after the first stop has stopped deflection of the frame.

3. The structure according to claim 2 wherein the second stop is a ring connected to the second sensor by a support structure, the support structure serving to transmit force to the second sensor when movement of the diaphragm is stopped.

References Cited

UNITED STATES PATENTS

| | | | |
|---|---|---|---|
| 2,421,222 | 5/1947 | Schaevitz | 73—141 |
| 2,582,886 | 1/1952 | Ruge | 73—141 |
| 3,222,628 | 12/1965 | Pien | 73—398 XR |
| 3,293,916 | 12/1966 | Goff | 73—398 |

DONALD O. WOODIEL, Primary Examiner

U.S. Cl. X.R.

73—141, 398

PO-1050
(5/69)

UNITED STATES PATENT OFFICE
CERTIFICATE OF CORRECTION

Patent No. 3,484,732             Dated    December 16, 1969

Inventor(s)  Robert W. Postma

It is certified that error appears in the above-identified patent and that said Letters Patent are hereby corrected as shown below:

Column 1, after line 4, please add ---assignor to North American Rockwell Corporation

SIGNED AND
SEALED
AUG 25 1970

(SEAL)
Attest:

Edward M. Fletcher, Jr.
Attesting Officer

WILLIAM E. SCHUYLER, JR.
Commissioner of Patents